April 22, 1958 T. W. MERRITT ET AL 2,831,456
DEMOUNTABLE MILK RECEIVER
Filed June 24, 1955 4 Sheets-Sheet 1

Inventors
Thomas W. Merritt
Chester A. Thomas
By Schraeder, Hofgren, Brady & Wegner
Attorneys April 22, 1958 T. W. MERRITT ET AL 2,831,456
DEMOUNTABLE MILK RECEIVER
Filed June 24, 1955 4 Sheets-Sheet 3

Inventors
Thomas W. Merritt
Chester A. Thomas
By Schroeder, Hofgren, Brady & Wegner
Attorneys

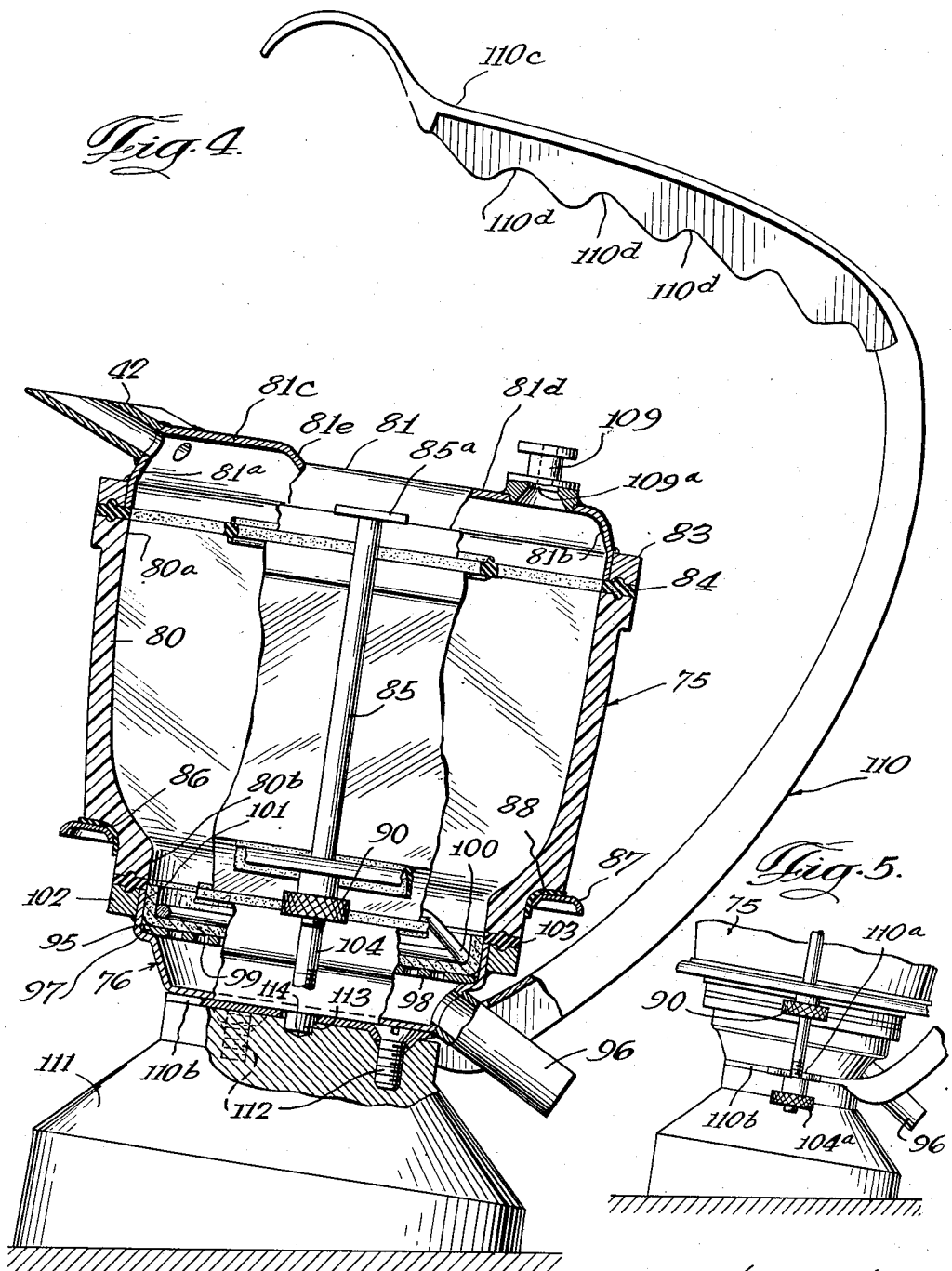

United States Patent Office 2,831,456
Patented Apr. 22, 1958

2,831,456

DEMOUNTABLE MILK RECEIVER

Thomas W. Merritt, St. Charles, and Chester A. Thomas, Lake Forest, Ill., assignors to Babson Bros. Co., a corporation of Illinois Application June 24, 1955, Serial No. 517,842

10 Claims. (Cl. 119—14.01)

This invention is concerned with milking apparatus and more particularly with milk receiving apparatus for use in carry-away milking systems.

The term "carry-away milk system" is generally used to refer to those systems in which milk passes directly from milk withdrawing apparatus attached to an animal into a conduit or pipe line through which it flows, usually under the influence of vacuum and gravity, to a delivery point, which may be common milk cans, a refrigerated tank, pasteurizing apparatus or the like. In some cases a pump is utilized to force the milk on through a portion of the system. Carry-away systems are to be contrasted with bucket milkers in which a milk-receiving bucket is either suspended beneath the animal or positioned on the floor adjacent the animal.

The milk contacted portions of carry-away milking systems, as all other apparatus used in milking, must be washed and sterilized thoroughly following each use; and at the present time the trend is toward the use of "in-place" washing systems for milk carry-away pipe lines and at least part of the associated milk handling apparatus.

It is a principal object of the present invention to provide a new and improved milk receiver for use with carry-away milk handling systems and particularly adapted for in-place washing.

One feature of the invention is the provision of milk receiving apparatus including a bowl unit having a lid portion provided with nipples adapted for connection to the milk tubes of teat cup assemblies, a bowl unit having an open bottom, a base member provided with an outlet nipple for connection to an evacuated carry-away milk line, a filter carried in the base member and means for independently removably securing the base member to the open bottom of the bowl unit. Another feature is that spring clamp means are provided for removably securing the filter in the base member.

A further feature is that the milk receiving apparatus includes a lid member provided with nipples, a bowl unit having an opening at its top and bottom, a gasket interposed between the lid and the top of the bowl, first attachment means securing the bowl, lid and gasket together in sealing relationship, a base member provided with an outlet nipple for connection to an evacuated carry-away milk line, a gasket interposed between the base member and the bottom of the bowl, and second attachment means securing the bottom member, bowl and last mentioned gasket together in sealing relationship.

Still another feature is the provision of milk receiving apparatus in which flush gaskets are used between the various members. Yet a further feature is that co-operating means are provided on the gaskets and adjacent members for properly positioning the parts during assembly.

Another feature is the provision of a milker lid including an upwardly extending, arcuate forward wall portion, a flat top portion, and a plurality of nipples defining milk passageways and adapted to be connected to the milk tubes of a plurality of teat cup assemblies, secured to and extending from the arcuate portion and adjacent the top portion. Yet a further feature is that the lid has a top including a generally planar forward portion, a generally planar rear portion spaced below the forward portion and a transversely extending inclined portion joining the two planar portions.

Further features and advantages will readily be apparent from the following specification and from the drawings, in which:

Figure 4 is a side elevational view, partially in section of a modified milk receiver;

Figure 5 is a reduced, fragmentary elevational view of the base portion of the milker of Figure 4;

Carry-away milk pipe line systems have been known and used for many years, and in the last ten years or so have gained greatly in popularity. This increased use is due at least in part to the trend toward larger dairy herds and the demand for labor-saving devices. With early carry-away milking systems it was necessary that the entire system be disassembled for washing following each milking; i. e., the sections of the pipe line had to be taken down and scrubbed with brushes to insure cleanliness. Recently, systems have been developed with which the milk pipe lines and much of the associated apparatus may be washed without disassembly. Such systems are sometimes referred to as "cleaned-in-place" or "CIP" systems. In these systems, the desired washing solutions, as rinse water, detergent or sanitizing solutions, are circulated through the pipe line and other apparatus by means of vacuum, pumps or a combination of the two.

Prior to the present invention it was necessary that the milk receiving apparatus, such as that shown in Thomas Patents 2,706,965 and 2,709,416, be completely disassembled and washed by hand separately from the rest of the system, in order to insure that it was properly cleaned. This was due largely to the fact that there are cracks and crevices in such prior milk receiving apparatus which are not adequately cleaned by a flow of water through the unit.

Figure 1:
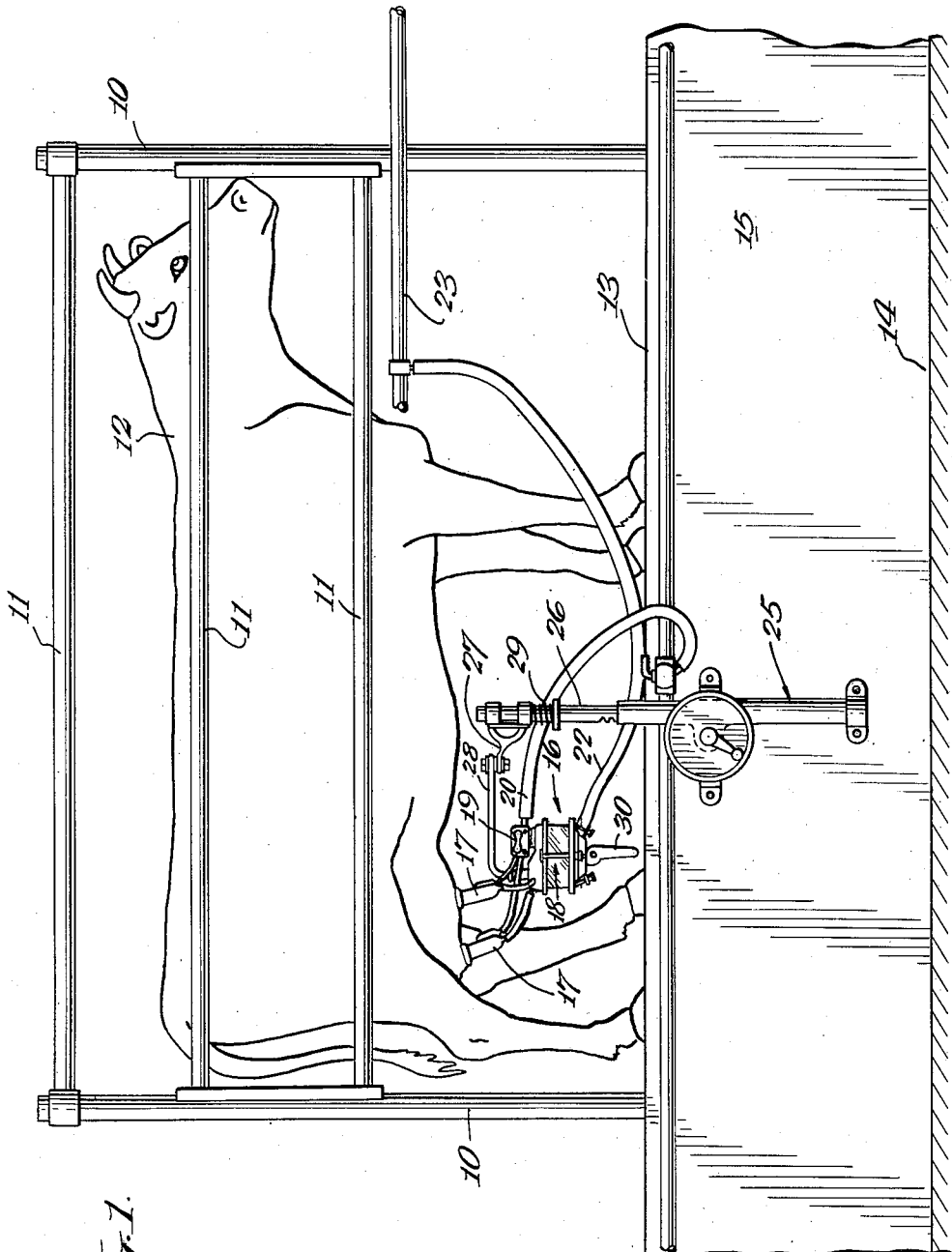
Figure 1 is a side elevational view of a cow in a milking parlor, showing milk receiving apparatus of the present invention in use.

Turning now to Figure 1 of the drawings, a milking parlor stall, comprising upright members 10 joined by horizontal members 11 is shown. The cow 12 stands on an elevated floor or cow alley 13 which may be two to three feet above the floor 14 of the operator's alley, the two floors being joined by a vertical wall 15. The single stall structure and aligned arrangement of the cow floor and operator's alley are shown for purposes of simplicity and in practice stalls such as those shown in Babson et al. Patent 2,477,035 or Thomas Patent 2,692,577 might be used.

The milking apparatus, indicated generally as 16, includes four teat cup units 17 secured to milk receiving apparatus 18. A pulsator 19 is mounted on top of the milk receiving apparatus and is connected through a hose 20 to a vacuum line 21. The milk withdrawing apparatus has connected to the bottom thereof a milk hose 22 connected to an evacuated milk carry-away pipe line 23.

The milk withdrawing apparatus is carried beneath the animal by supporting mechanism indicated generally as 25 and including a vertically movable post 26 to which is secured an inwardly extending arm 27 which carries at its inner end a rearwardly extending arm 28 to which is connected the milk withdrawing apparatus. A spring 29 urges the first arm 27 forwardly, providing a forward component of pull on the animal's teats, while post 26 is adjusted to provide a downward pull. Further details of the supporting arrangement may be found in Babson Re. 22,368. A leg 30 on the bottom of milk withdrawing apparatus prevents the teat cups from touching the floor should they accidentally become disengaged.

The milk receiver has a capacity sufficient to hold all of the milk delivered from the cow in a single pulsation; as at least a pint and preferably of the order of one or one and a half quarts. This permits the milk to separate from the ends of the milk tubes, preventing milk from washing back around the teats when the inflations expand.

Following the milking operation, the milking system may readily be converted for washing by making suitable connections with a source of washing solution. Details of several washing systems are shown in Merritt application, Serial No. 485,773, filed February 2, 1955, and Thomas application, Serial No. 435,812, filed June 10, 1954, and reference may be had thereto for further information regarding these systems.

Figure 2:
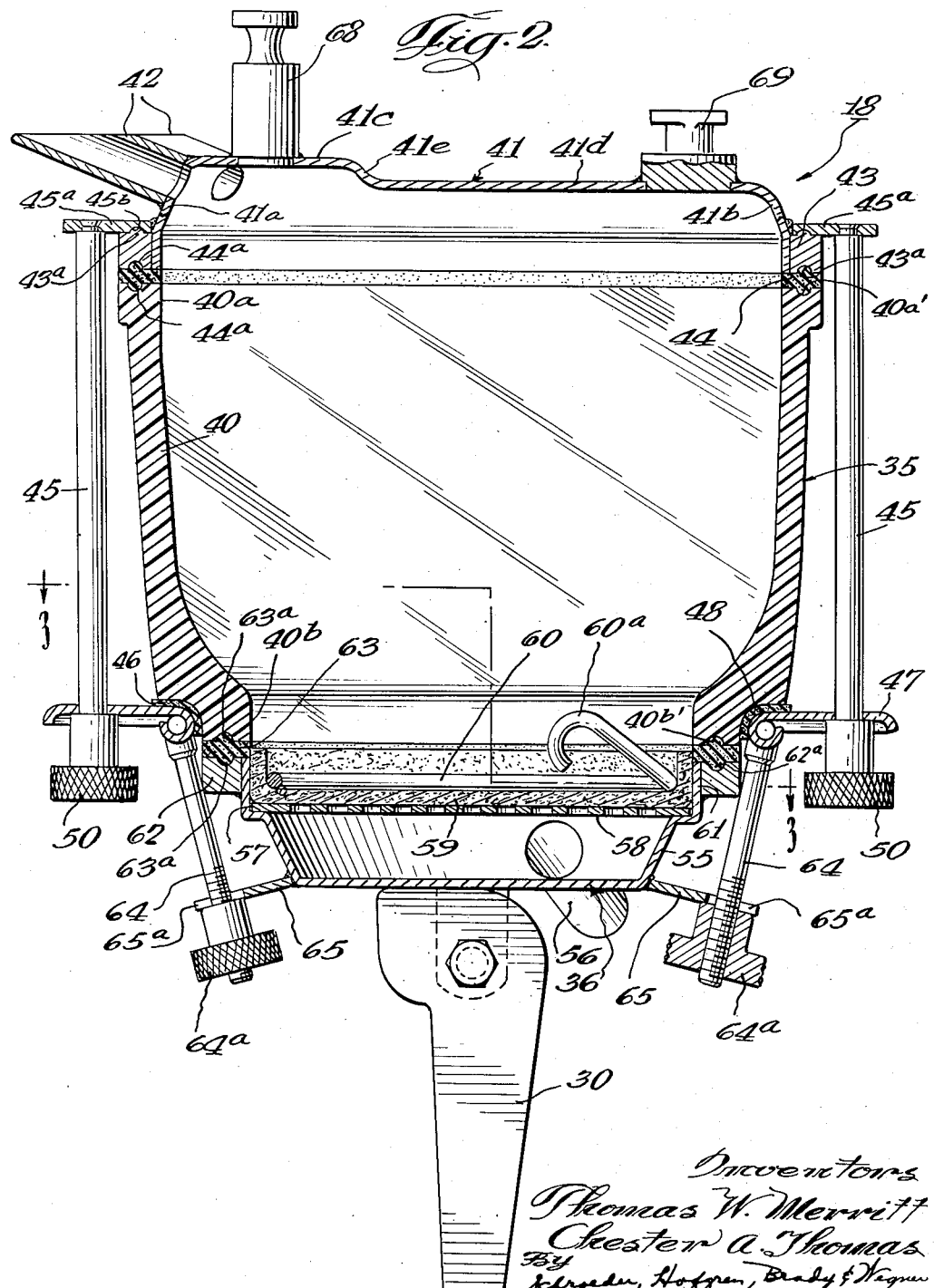
Figure 2 is a vertical sectional view of the milk receiving apparatus of Figure 1 taken longitudinally through the upper portion of the lid and transversely through the rest of the apparatus.
Figure 3:
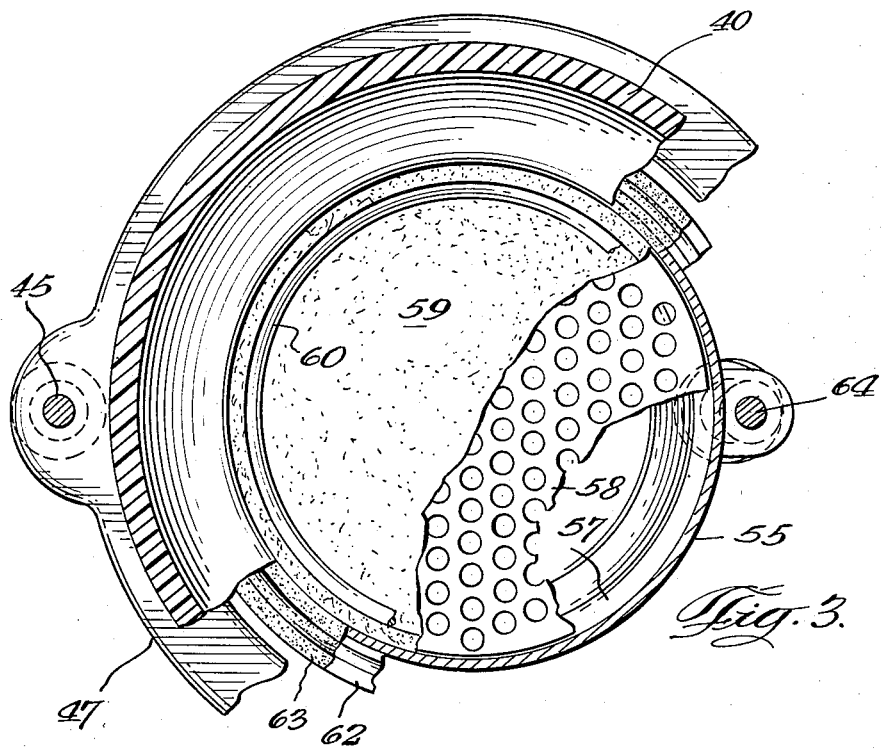
Figure 3 is a broken horizontal sectional view taken substantially along line 3—3 of Figure 2.

Turning now to Figure 2 of the drawings, it will be seen that the milking apparatus indicated generally as 18 includes a bowl unit 35 and a base unit 36. The bowl unit 35 has a bowl 40, of transparent glass material, through which the flow of milk may be observed and having an open top and bottom 40a and 40b respectively. A lid member 41 is provided with a plurality of nipples 42 over which the milk tubes of the teat cup inflations are secured. Extending peripherally along the lower edge of lid member 41 is a bar ring 43 which is welded to a vertically extending portion of the lid. An external shoulder 46 is formed adjacent the open lower end of bowl 40 and adapted to receive an annular clamping ring 47, which is spaced from the bowl 40 by a resilient cushion pad 48, to prevent breakage of the bowl. A resilient gasket 44 is interposed between the bar ring 43 and the open top of bowl 40, and the entire assembly is secured together in liquid-tight engagement by a pair of tie bolts 45. Tie bolts 45 are provided at their upper ends with inwardly extending ears 45a which are riveted to the ends of the bolts and which have formed therein small depressions 45b, adapted to mate with protuberances 43a on the upper surface of bar ring 43. The lower ends of the tie rods extend through openings provided in clamping ring 47 and knurled nuts 50 permit the bowl unit to be dismantled when necessary, as to replace gasket 44.

The base unit 36 of the milk receiving apparatus comprises a cup-shaped base member 55 which has secured thereto a nipple 56 to which is connected the evacuated carry-away milk hose 22. Base member 55 is generally cup-shaped in cross section and is provided with an inwardly directed, internal annular shoulder 57 on which is removably carried an apertured filter supporting plate 58. Carried on the plate 58 is a filter element 59, preferably of a cotton fiber material. The filter member 59 is slightly larger in diameter than the diameter of base member 55 and when properly positioned therein extends upwardly around the peripheral rim 61 of the base member. The filter is securely held in the base member by an annular spring clamp 60, which extends slightly less than all the way around the interior of the base member and urges the filter outwardly against the upstanding rim 61. The spring clamp is provided with upwardly and inwardly directed looped end portions 60a by means of which it may be grasped and removed from the base member permitting removal of the filter.

A bar ring 62 is welded to the outside of the rim portion 61 of base member 55; and a resilient gasket 63 is interposed between bar 62 and the open bottom 40b of the bowl member. A pair of eye bolts 64 are pivotally carried by clamping ring 47 and are movable into longitudinal slots 65a formed in ears 65 secured to the bottom of base member 55. Knurled knobs 64a removably secure base unit 36 to bowl unit 35 and in fluid-tight engagement therewith.

Several features of the milk receiving apparatus 18 particularly adapt it for CIP washing operations, the apparatus being thoroughly cleaned by a flow of washing solution therethrough. This eliminates the necessity for completely disassembling the milk receiving apparatus for washing by hand.

First, gaskets 44 and 63 are what are termed "flush" gaskets. That is, when the various elements of the apparatus are secured together in liquid-tight relationship, the inner surface of the bottom of lid 41, the inner surface of gasket 44 and the inner surface of the open upper portion 40a of the bowl form a smooth unbroken surface, with no crevices in which milk may become lodged. The same relationship holds true for the inner surfaces of base member 55, gasket 63 and the open bottom 40b of the bowl.

Figures 6, 7:
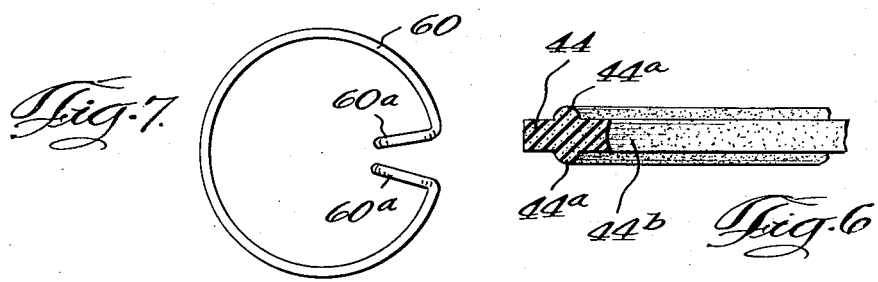
Figure 6 is an enlarged fragmentary sectional view of an unstressed flush gasket.
Figure 7 is a reduced plan view of the filter spring clamp.
Figure 8:
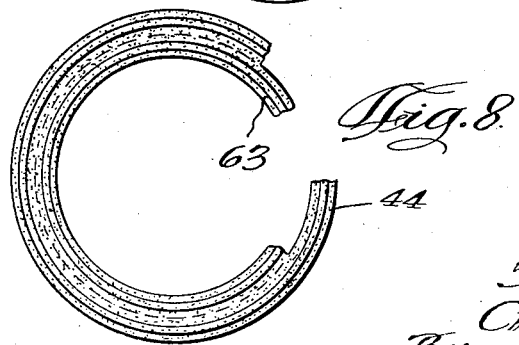
Figure 8 is a reduced broken plan view of the gaskets.

In order to accomplish this, the gaskets 44 and 63, which are preferably of a synthetic rubber material, are formed so that in unstressed condition the inner surfaces thereof are slightly concave, as at 44b, Figure 6, whereby when the gasket is compressed, the inner surface forms a straight line joining the inner surfaces of the adjacent members. It should be noted that the outer diameter of gasket 63 is substantially identical with the inner diameter of gasket 44. This permits both gaskets to be molded as an integral unit, Figure 8, and then separated, as by die cutting.

Gaskets 44 and 63 are both provided with upstanding annular tongues 44a and 63a respectively, which engage with mating grooves 43a, 40a', 40b' and 62a, in bar ring 43, the top and bottom surfaces of bowl 40 and bar ring 62, respectively, to facilitate proper alignment of the elements of the apparatus during assembly. This insures that the inner surface of the assembled apparatus will be free from crevices in which milk might lodge.

The independent securing means for fastening base member 55 to the bowl unit 35 permits opening of the base unit after milking and before start of the washing operation, without completely disassembling the apparatus. This allows removal of the filter, a necessary step before washing, without the danger of getting milk on most surfaces which are not contacted by the washing solutions when the unit is assembled. If, during the removal of the filter, some milk should accidentally get on the mating surfaces of gasket 63, base member or the bottom of the bowl, it may easily be rinsed off before the elements are reassembled prior to washing.

The lid 41 is provided with an upstanding arcuate portion 41a at the forward edge thereof (the term forward being here used to indicate that portion of the lid which faces toward the rear of the animal being milked) and an arcuate rear portion 41b. The top of the lid includes a planar forward portion 41c joined with the upstanding arcuate portion 41a, and a planar rear portion 41d, joined with arcuate rear portion 41b, but on a plane below portion 41c. The two planar portions 41c and 41d of the top surface of the milker lid are joined along a transverse, inclined portion 41e which extends completely across the lid. Secured to and extending upwardly from the top portion 41c is a post 68 which may be secured to the end of milker support arm 28. Projecting upwardly from the lower level 41d of lid top portion is a pulsator support post 69, which carries pulsator 19. The two level lid provides adequate space on upstanding arcuate portion 41a for the securing thereto of nipples 42 while also providing sufficient clearance between the top of pulsator 19 and support arm 28, permitting adjustment and lubrication of the pulsator without removing it from the apparatus.

Nipples 42 are secured to the arcuate forward portion 41a of the lid so that the bore 42a thereof enters through the lid, tangent to the underside of the top of the lid. (In practice, the nipples are welded to the solid surface of the lid and then the hole is drilled through the lid surface.) In many CIP washing systems, a reservoir or tank for washing solution is provided and includes a rack in which the milk withdrawing apparatus is suspended during washing (see aforementioned Merritt application, Serial No. 485,773). These racks are so designed that the milking apparatus is suspended with the forward portion of the lid lowermost and the teat cup assemblies hang down into the washing solution. If the nipples 42 were not secured to the lid as shown and described, with the milk passageways entering the lid on the arcuate forward portion thereof and adjacent the top surface, washing solution might become trapped within the apparatus, and contaminate the milk during the next milking.

All of the inner concave corners of the lid, as at 41f, 41g and 41h have a radius of at least one-quarter inch. This facilitates proper cleaning of the lid by the circulation of the washing solution through the apparatus, eliminating any need for manual scrubbing of small crevices.

Many dairy farms are not equipped with parlor stalls of the type shown in Figure 1, or for other reasons are not well adapted for use of the adjustable support arrangement 25. In some instances it may be desirable to use a milk receiving apparatus which may be supported from a surcingle passed over the back of the cow. Turning now to Figure 4, a modified milk receiver for such use is shown.

In many respects, this receiver is similar to the milk receiver of Figure 2 and reference numerals forty higher than those used in Figure 2 will be utilized to indicate like elements. The receiving apparatus includes a bowl unit 75 and a base unit 76. A transparent bowl member 80 has an open top 80a to which is secured a lid 81 with a flush gasket 84 interposed therebetween. The bowl has an outwardly directed shoulder 86 adjacent the bottom thereof which receives a clamping rim 87 by cushioned resilient pad 88. A tie rod 85, there being one on either side of the assembly, has an inwardly directed ear 35b which engages the upper surface of bar ring 83; and the lower end of the tie rod extends through an opening in clamp ring 87 and is secured by a knurled nut 90.

Cup-shaped base member 95 is formed with an inwardly directed shoulder 97 on which rests an apertured filter support plate 98; the cotton fiber filter 99 being secured inside upstanding rim 101 by spring clamp 100. Bar ring 102 is welded to the outer surface of base member 95 and resilient gasket 103 is inserted between the base member and the open bottom 80b of the bowl. Eye bolt 104 is pivotally connected to clamping ring 87 and is swingable into a slot 110a formed in an outwardly projecting portion of the end surface 110b of a handle member indicated generally as 110. (Again, there are two eye bolts 104, the other being at the far side of the unit as viewed in Figures 4 and 5.)

A weight 111 is fastened to the undersurface of end portion 110b of the handle by machine screws 112; and a stud 113 secured to the bottom of base member 35 extends through an opening in handle end portion 110b and into a bore 114 provided in weight 110, serving to position the base properly on the handle and weight assembly. The upper end 110c of the handle extends forwardly over the top of the milk receiver and is provided with a plurality of notches 110d on the undersurface thereof which are adapted to be engaged with the cross piece hung from a surcingle strap. The weight 111 is sufficient to give the entire assembly the weight of between fifteen and twenty pounds to provide the desirable downward and forward tug and pull to the animal's teats during milking. Milk outlet nipple 96 is secured to the side wall of base 95 and extends generally downwardly and outwardly through an opening formed in handle 110.

As in the previously described apparatus, base unit 76 may be separated from bowl unit 75 by loosening thumb screw 104a attached on eye bolt 104, permitting removal of filter 99 before the unit is washed.

Gaskets 84 and 103 have, in unstressed condition, a concave inner surface so that when the parts are assembled, the inner surface of rim 81, gasket 84 and the top 80a of the bowl form a smooth unbroken surface; and similarly the open bottom 80b of the bowl, inner surface of gasket 103 and of upstanding rim 101 of base member 95 form a smooth surface. The gaskets and mating parts are properly positioned by cooperating tongues and grooves formed therein.

The lid 81 is quite similar with lid 41 and has a forward, upwardly extending arcuate portion 81a and a rear arcuate portion 81b; and a top surface including a first planar portion 81c joined with upwardly extending arcuate portion 81a, a second planar portion 81d below the first and joined with the arcuate portion 81b, and a transverse inclined portion 81e joining the planar portions. The inner concave corners of the lid are all rounded and have a radius of at least one-quarter of an inch, facilitating washing. The pulsator post 109 is mounted on the lower planar portion 81d of the lid and in this instance is provided with a bore 109a permitting use with a special pulsator (see Merritt Patent 2,683,437) which periodically admits a small amount of air to the milk receiving apparatus speeding the flow of milk from the bowl 80 and insuring separation of the milk form the milk passageways of the nipples 42 to the milk tubes of the inflations. This is desirable with the surcingle supported unit, as the milk carry-away line is often elevated several feet above the animal being milked and the small amount of air which is admitted aids the flow of milk.

While we have shown and described certain embodiments of our invention, it is to be understood that it is capable of many modifications. Changes therefore, in the construction and arrangement may be made without departing from the spirit and scope of the invention as disclosed in the appended claims.

We claim:

1. Milk receiving apparatus of the character described, for use in a carry-away milk handling system, comprising: a lid member provided with nipples to be connected to the milk tubes of a plurality of teat cup assemblies; a transparent bowl having an opening at its top and bottom and having an annular shoulder formed therein adjacent the bottom; a sealing gasket interposed between said lid and the top of said bowl; a ring about said bowl; a cushion interposed between said ring and shoulder; first attachment means interconnecting said lid and ring for securing said lid, bowl and gasket together in sealing relationship; a base member provided with an outlet nipple for connection to an evacuated carry-away milk line; a sealing gasket interposed between said base member and the bottom of said bowl; and second attachment means interconnecting said base member and ring, independent of the first attachment means, securing said bottom member, bowl and last mentioned gasket together in sealing relationship.

2. Milk receiving apparatus of the character described, for use in a carry-away milk handling system, comprising: a lid member provided with nipples to be connected to the milk tubes of a plurality of teat cup assemblies; a bowl having an opening at its top and bottom; a sealing gasket interposed between said lid and the top of said bowl; attachment connecting means operably associated with said bowl first attachment means interconnecting said lid and said attachment connecting means securing said lid, bowl and gasket together in sealing relationship;

a base member provided with an outlet nipple for connection to an evacuated carry-away milk line; a sealing gasket interposed between said base member and the bottom of said bowl; second attachment means, independent of the first attachment means, interconnecting said base member and said attachment connecting means securing said bottom member, bowl and last mentioned gasket together in sealing relationship; and a filter carried in said base member.

3. Milk receiving apparatus of the character described, for use in a carry-away milk handling system, comprising: a lid member provided with nipples to be connected to the milk tubes of a plurality of teat cup assemblies; a bowl having an opening at its top and bottom and having an annular shoulder adjacent the bottom; a sealing gasket interposed between said lid and the top of said bowl; an annular ring in engagement with said shoulder; first attachment means interconnecting said lid and ring securing the lid, bowl and gasket together in sealing relationship; a base member provided with an outlet nipple for connection to an evacuated carry-away milk line; a filter removably carried in said base member for filtering the milk before it passes to said outlet nipple; a sealing gasket interposed between said base member and the bottom of said bowl; and second attachment means, independent of the first attachment means, interconnecting said ring and base member for releasably securing said base member, bowl and last mentioned gasket together in sealing relationship.

4. Milk receiving apparatus of the character described, for use in a carry-away milk handling system and adapted for in-place washing, comprising: a lid member provided with nipples to be connected to the milk tubes of a plurality of teat cup assemblies; a bowl having openings at its top and bottom; a sealing gasket interposed between said lid member and the top of said bowl; attachment connecting means operably associated with said bowl; first attachment means interconnecting said lid and attachment connecting means, securing said lid, bowl and gasket together in sealing relationship; a cup-shaped base member having an inwardly extending annular shoulder and being provided with an outlet nipple adapted for connection to an evacuated carry-away milk line; a sealing gasket interposed between said base member and the bottom of said bowl; second attachment means, independent of the first attachment means, interconnecting said base member and said attachment connecting means, securing said bottom member, bowl and last mentioned gasket together in sealing relationship; a foraminous member carried by said shoulder; a filter member supported by said foraminous member; and a spring clamp removably securing said filter member in said base member.

5. Milk receiving apparatus of the character described in claim 4, wherein said filter member is larger in diameter than the rim of said base member and the peripheral portion of the filter extends upwardly along said rim and an annular, spring-wire clamping member extends around a portion of the upturned periphery of the filter, urging it against said rim, said wire member having upwardly extending, manually engageable end portions for facilitating manipulation thereof.

6. Milk receiving apparatus of the character described, for use in a carry-away milk handling system, comprising: a lid member provided with nipples to be connected to the milk tubes of a plurality of teat cup assemblies; a bowl having an opening at its top and being provided with an outlet nipple for connection to an evacuated carry-away milk line; a flush gasket interposed between said lid and the top of said bowl; and means securing said lid, bowl and gasket together in sealing relationship, the inner surface of said gasket joining the inner surfaces of the lid and the top of the bowl, defining a smooth, unbroken surface.

7. Milk receiving apparatus of the character described, for use in a carry-away milk handling system and adapted for in-place washing, comprising: a lid member provided with nipples to be connected to the milk tubes of a plurality of teat cup assemblies; a bowl having an opening at its top and bottom; a sealing gasket interposed between said lid and the top of said bowl; means securing said lid, bowl and gasket together in sealing relationship, the inner surface of said gasket joining the inner surfaces of the lid and of the top of said bowl, defining a smooth, substantially flat unbroken surface; a base member provided with an outlet nipple for connection to an evacuated carry-away milk line; a sealing gasket interposed between said base member and the bottom of said bowl; and means securing said base member, bowl and last mentioned gasket together in sealing relationship, the inner surface of said last mentioned gasket joining the inner surface of said base member and of the bottom of said bowl, forming a smooth unbroken surface.

8. Milk receiving apparatus of the character described, for use in a carry-away milk handling system, comprising: a lid member provided with nipples to be connected to the milk tubes of a plurality of teat cup assemblies; a bowl member having an opening at its top and bottom; a sealing gasket interposed between said lid and the top of said bowl; means securing said lid, bowl and gasket together in sealing relationship; a base member provided with an outlet nipple for connection to an evacuated carry-away milk line; a sealing gasket interposed between said base member and the bottom of said bowl; means securing said bottom member, bowl and last mentioned gasket together in sealing relationship; and cooperating means on said gaskets and each of the adjacent members for properly positioning said members during assembly, the inner surfaces of the gasket and each of the adjacent members defining smooth, unbroken surfaces.

9. Milk receiving apparatus of the character described in claim 8, wherein said cooperating means comprise annular tongues and grooves.

10. Milk receiving apparatus of the character described, for use in a carry-away milk handling system and adapted for in-place washing, comprising: a lid member provided with a plurality of nipples to be connected to the milk tubes of a plurality of teat cup assemblies, the nipples entering the lid tangent to the top surface thereof, and all inner, concave corners of the lid having a radius at least of the order of one-quarter inch; a bowl having an opening at its top and being provided with an outlet nipple for connection to an evacuated carry-away milk line; a flush gasket interposed between said lid and the top of said bowl; and means securing said lid, bowl and gasket together in sealing relationship; the inner surfaces of said lid, bowl and gasket defining a smooth, unbroken surface.

References Cited in the file of this patent

UNITED STATES PATENTS

| 530,835 | Glynn | Dec. 11, 1894 |
| 1,292,935 | Walsh | Jan. 28, 1919 |
| 2,502,363 | Babson | Mar. 28, 1950 |
| 2,613,637 | Crawford | Oct. 14, 1952 |
| 2,667,855 | Scott | Feb. 2, 1954 |
| 2,683,437 | Merritt | July 13, 1954 |
| 2,706,965 | Thomas | Apr. 26, 1955 |
| 2,735,399 | Henrard | Feb. 21, 1956 |
| 2,755,769 | Larson | July 24, 1956 |
| 2,777,420 | Schilling | Jan. 15, 1957 |

FOREIGN PATENTS

| 110,667 | Australia | May 22, 1940 |
| 223,335 | Great Britain | Oct. 23, 1924 |